United States Patent [19]

Wells

[11] 4,439,668
[45] Mar. 27, 1984

[54] PEDESTAL TYPE ELECTRO-HEATED CONTAINER

[76] Inventor: Alton R. Wells, 4573 W. Trade Winds Ave., Lauderdale-by-the-Sea, Fla. 33308

[21] Appl. No.: 411,849

[22] Filed: Aug. 26, 1982

[51] Int. Cl.³ .............................................. F27D 11/02
[52] U.S. Cl. .................................... 219/438; 219/433; 219/437; 219/441
[58] Field of Search ............... 219/429, 430, 433, 434, 219/435, 437, 436, 438, 439, 441, 521; 126/373

[56] References Cited

U.S. PATENT DOCUMENTS

| | | | |
|---|---|---|---|
| 1,814,754 | 7/1931 | James | 219/433 |
| 1,848,449 | 3/1932 | Wiegand | 219/437 |
| 1,994,206 | 3/1935 | Ziskin et al. | 219/438 X |
| 2,012,981 | 9/1935 | Wilsey | 219/433 |
| 3,137,786 | 6/1964 | Wells et al. | 219/441 |
| 3,138,698 | 6/1964 | Wells et al. | 219/441 |
| 3,187,163 | 6/1965 | Wells et al. | 219/441 |
| 3,319,048 | 5/1967 | Wells et al. | 219/441 |
| 3,549,861 | 12/1970 | Trachtenberg et al. | 219/441 |
| 3,681,568 | 8/1972 | Schaefer | 219/432 |
| 3,904,086 | 9/1975 | Losenno | 219/433 X |

FOREIGN PATENT DOCUMENTS

| | | | |
|---|---|---|---|
| 346981 | 3/1937 | Italy | 219/438 |
| 204809 | 10/1923 | United Kingdom | 219/438 |
| 488305 | 7/1938 | United Kingdom | 219/437 |
| 1282252 | 7/1972 | United Kingdom | 219/437 |

Primary Examiner—Volodymyr Y. Mayewsky
Attorney, Agent, or Firm—Oldham, Oldham, Hudak, Weber & Sand Co.

[57] ABSTRACT

An electro-heater container comprising a cup having a bottom and including a stem type support pedestal formed as a unit with the cup, the bottom having a center aperture therein extending through said support pedestal, and an electric heater unit is secured to the bottom by a member extending through the stem and a base disc of the support pedestal for heating contents of the container.

1 Claim, 2 Drawing Figures

PEDESTAL TYPE ELECTRO-HEATED CONTAINER

BACKGROUND ART

At the present time, there have been more and more demands for small food heating containers and some electrical heating or heated containers have been provided heretofore. These containers should have a controlled heat supply, preferably the container should be durable with safe heating units therein, and preferably the completed heater-container is compact and not extremely high in cost. Preferably, in these containers of the invention, some type of a control mechanism is provided in association with the heater and, thus, thermostats or thermostat-heater units, as shown in U.S. Pat. No. 3,767,898 may be provided and used to provide heat for contents of the container, but not to overheat the same.

DISCLOSURE OF INVENTION

The general object of the present invention is to provide a relatively inexpensive, compact, safe, efficient heater-container for heating small volumes of food.

Another object of the invention is to modify a standard cup currently available on the market slightly and to combine an electric heater therewith to form a durable heated container which has a stem support including a base support disc that will position the container solidly on a support surface, and which disc is spaced from the power supply leads.

Another object of the invention is to provide an electric heated container wherein at least several convolutions of a power supply lead can be conveniently stored on the container stem on a concave storage area on the pedestal portion of the container.

Another object is to form a compact, sturdy, heater-container from a relatively few parts, most of which are conventional.

The foregoing and other objects and advantages of the invention will be made more apparent as the specification proceeds, are achieved by: an electro-heater container comprising a cup including a bottom and a support pedestal for the cup extending downwardly from said bottom and formed as a unit with the cup, said pedestal including a center stem terminating in a base support disc, said bottom disc having an aperture therein offset from said center stem, a heater unit secured to said bottom and extending up into said cup, and power supply leads extending through the aperture in said bottom and connecting to said heater unit, which leads are radially offset from said center stem.

BRIEF DESCRIPTION OF DRAWINGS

With reference to the accompanying drawings.

When referring to corresponding members shown in the drawings and referred to in the specification, corresponding numerals have been used to facilitate comparison therebetween.

BEST MODE FOR CARRYING OUT THE INVENTION

Figure 1:
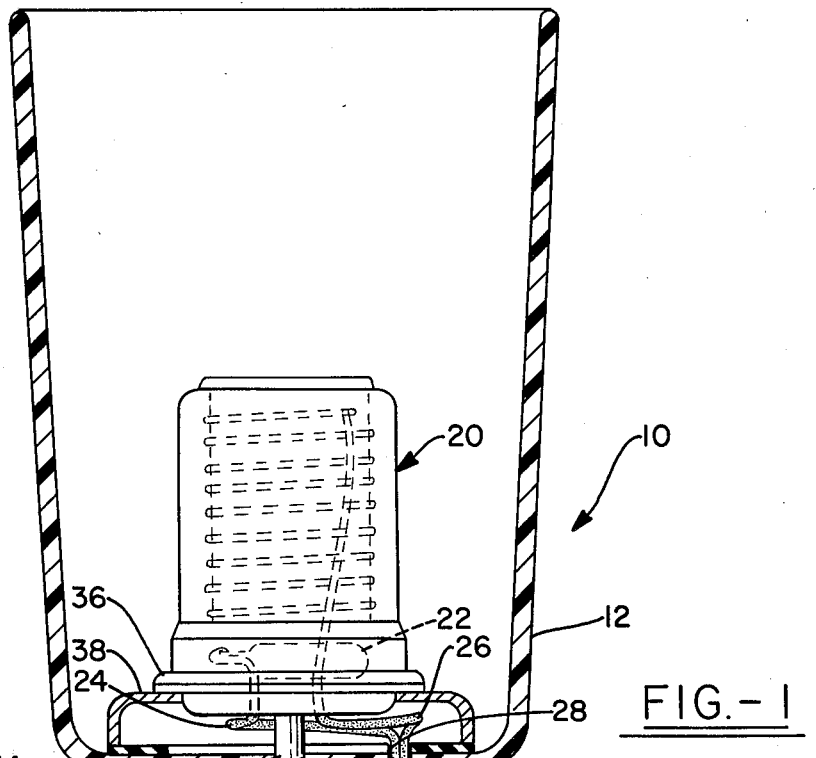
FIG. 1 is a vertical section of the new heater-container.
Figure 2:
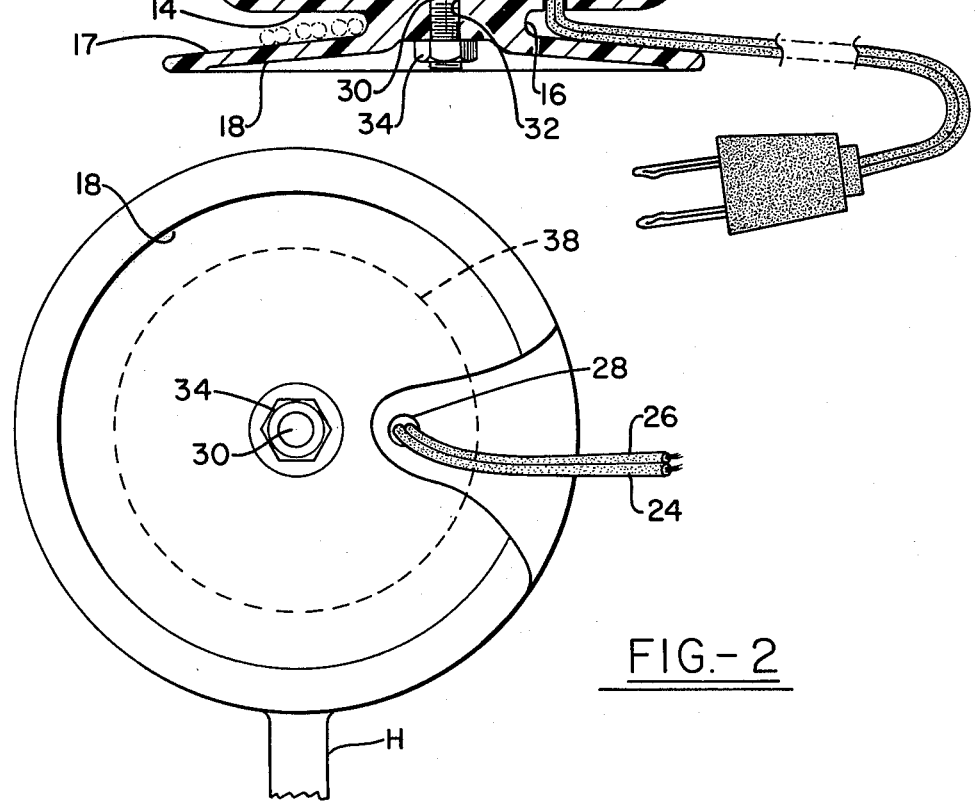
FIG. 2 is a bottom plan of the container of FIG. 1.

This invention, as one embodiment thereof, comprises a plastic cup, including a bottom and a stem type support pedestal formed as a unit with the cup, the bottom and pedestal having a center aperture therein, a heater unit secured to the bottom in sealed engagement therewith and extending up into the cup by mounting means extending down through the aperture and engaging the lower surface of a bottom support disc for heater support action, and power supply leads connecting to the heater and extending through an opening in the bottom of the cup to connect to the heater unit.

Reference now is particularly made to the details of the electro-heater container shown in the drawings and indicated as a whole by the numeral 10. This container 10 primarily comprises a cup 12 that has a flat bottom 14 therein, spaced vertically from and being above the actual lowermost portion of the cup 12 which is a stem-like support 16 and a base disc 17. The cup 12 is supported on the disc 17 that normally has a concave bottom surface 18. The support 16 preferably has a vertically short outer surface which is defined by the adjacent surfaces of the bottom 14 and disc 17 for a purpose to be described hereinafter.

So as to provide a controlled heat supply in the container 10, an electric heater, indicated as a whole by the numeral 20, is positioned in the cup 12 and extends upwardly from the bottom 14. This heater 20 preferably is of the type shown in U.S. Pat. No. 3,767,898 or 3,439,150, and it includes a heater coil wrapped around a ceramic core and, normally, also including a control thermostat 22 connected in series with the heater coil. Such heater-thermostat unit only requires two power supply leads 24, 26 rather than four power leads extending from the heater and thermal control and these two leads extend through a hole 28 provided in the bottom 14 offset from the stem 16.

As a feature of the invention, a center stud 30 extends down from the heater 20 and is used to mount the heater in the unit. Such stud 30 is secured to the heater in any conventional manner as by being attached to a bottom plate (not shown) of the heater. The stud 30 extends through a center aperture 32 of the support 16 and is secured thereto by a nut 34. Such nut 34 is positioned in an enclosed area formed by the bottom surface 18.

The heater 20 has a base flange 36 engaging a support cup or ring 38 on the bottom 14 and drawn into tight engagement by the stud 30. Any suitable gaskets seal the heater and ring 38 together.

Preferably, this pedestal support 16 and its outer surface area of such shape that a plurality of convolutions of the leads 24 and 26 can be stored on its outer surface, or at least a short length thereof can be stored, in combination with the container to facilitate making a compact readily usable article from the container of the invention.

The adjacent surfaces of the bottom 14 and base disc 17 define a space that narrows vertically at radially inner portions thereof. This facilitates storing or wedging convolutions of the leads in this vertically narrow space. Any suitable handle is provided on the cup 12. Preferably, this cup is made from suitable plastic material and the heating action is controlled within safe heating limits by the thermostat 22 packaged with the heater device 20.

The unit of the invention actually is made from a commercially available cup requiring only the drilling or formation of the hole 28 in the bottom of the cup 12, and the drilling of the hole 32 in the stem pedestal, whereby the units of the invention can be readily assembled with the cup. The product can be made inexpensively, but provide a durable, compact, practical unit for heating small quantities of food or drink to desired temperatures, all as established by the control setting of the heater and thermostat 20 and 22, respectively, of the invention.

Any suitable handle H is provided on the container.

The leads can be sealed in the hole 28 as by epoxy resins solidified in place, and the stud 30 and nut 34 preferably have thermal insulating and sealing gaskets or washers assembled therewith.

This invention provides a compact, inexpensive, unitary structure for beverage heating and such type of unit has not been available heretofore.

The unit of the invention will provide a good operative life and is sturdy so that it can be packaged and carried readily, but still function satisfactorily, be safe and not overheat. Thus, the objects of the invention have been achieved.

While one complete embodiment of the invention has been disclosed herein, it will be appreciated that modification of this particular embodiment of the invention may be resorted to without departing from the scope of the invention.

What is claimed is:

1. An electro-heater container comprising a cup made of electrically insulative material and including a bottom and a support pedestal for the cup extending downwardly from said bottom and formed integrally with the cup, said pedestal including a center stem terminating in a base support disc, said bottom having an aperture therein offset from said center stem, a heater unit secured to said bottom and extending up into said cup, power supply leads extending through and sealed in the aperture in said bottom and connecting to said heater unit, which leads are radially offset from said center stem, said heater unit and power supply leads being electrically insulated;

said support disc having a bottom surface that is concave in vertical section, means securing said heater unit to said bottom extend through said center stem and include a portion received in the concave portion of said support disc;

said center stem vertically separates said base support disc from said bottom and several convolutions of said leads can be stored on said center stem; and a support ring engaging said heater unit and positioning it on said bottom, said support ring being in tight engagement with said cup and said heater unit; and said aperture is within the periphery of said ring.

* * * * *